United States Patent
J et al.

(10) Patent No.: US 12,360,875 B2
(45) Date of Patent: Jul. 15, 2025

(54) SYSTEMS, APPARATUSES, METHODS, AND COMPUTER PROGRAM PRODUCTS FOR GENERATING ONE OR MORE MONITORING OPERATIONS

(71) Applicant: HONEYWELL INTERNATIONAL INC., Charlotte, NC (US)

(72) Inventors: Narayana J, Hyderabad (IN); Dipanjan Saha, Bangalore (IN); Arnab Bhattacharjee, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/298,813

(22) Filed: Apr. 11, 2023

(65) Prior Publication Data
US 2024/0345934 A1 Oct. 17, 2024

(51) Int. Cl.
G06F 11/00 (2006.01)
G06F 9/451 (2018.01)
G06F 11/34 (2006.01)
G06F 11/3604 (2025.01)

(52) U.S. Cl.
CPC .......... *G06F 11/3409* (2013.01); *G06F 9/451* (2018.02); *G06F 11/3612* (2013.01)

(58) Field of Classification Search
CPC .. G06F 11/3409; G06F 11/3612; G06F 9/451; G06F 11/302
USPC ........................................................ 714/1–57
See application file for complete search history.

(56) References Cited

U.S. PATENT DOCUMENTS

| | | | | |
|---|---|---|---|---|
| 7,954,062 | B2* | 5/2011 | Bright | G06F 11/0751 714/48 |
| 2006/0005063 | A1* | 1/2006 | Patrick | G06F 11/0772 714/1 |
| 2012/0124410 | A1* | 5/2012 | Chun | G06F 11/0736 714/2 |
| 2012/0173581 | A1* | 7/2012 | Hartig | G06F 11/0745 707/E17.001 |
| 2015/0067408 | A1* | 3/2015 | Jeon | G06F 9/542 714/47.1 |
| 2015/0370625 | A1* | 12/2015 | Nakajima | G06F 11/0751 714/37 |
| 2016/0274990 | A1* | 9/2016 | Addleman | G06F 11/3409 |

(Continued)

*Primary Examiner* — Sarai E Butler
(74) *Attorney, Agent, or Firm* — ALSTON & BIRD LLP

(57) ABSTRACT

Systems, apparatuses, methods, and computer program products for generating one or more monitoring operations are provided. For example, a method provided herein may include causing a component interface to be displayed on a user interface. In some embodiments, the component interface comprises one or more components of a computing application. In some embodiments, the method may include causing a modeling interface to be displayed on the user interface. In some embodiments, the method may include receiving a selection of at least one of the one or more components of the computing application. In some embodiments, the method may include causing an updated modeling interface to be displayed on the user interface. In some embodiments, the updated modeling interface comprises a computing application architecture model. In some embodiments, the method may include applying an analyzer scanning model to the computing application architecture model to generate the one or more monitoring operations.

20 Claims, 9 Drawing Sheets

(56) References Cited

U.S. PATENT DOCUMENTS

| | | | | |
|---|---|---|---|---|
| 2019/0384692 A1* | 12/2019 | Liu | .................... | G06F 11/3636 |
| 2020/0065173 A1* | 2/2020 | Puli | .................... | G06F 11/3072 |
| 2020/0201727 A1* | 6/2020 | Nie | ...................... | G06N 20/00 |
| 2021/0311862 A1* | 10/2021 | Jakubiak | ................. | G06F 40/14 |
| 2022/0147411 A1* | 5/2022 | Singh | ................. | G06F 11/0709 |
| 2023/0105304 A1* | 4/2023 | Mandal | ............... | G06F 11/3476 |
| | | | | 714/37 |

\* cited by examiner

MODELING INTERFACE 500

CREATE COMPUTING APPLICATION ARCHITECTURE MODEL 502

FIG. 5

SYSTEMS, APPARATUSES, METHODS, AND COMPUTER PROGRAM PRODUCTS FOR GENERATING ONE OR MORE MONITORING OPERATIONS

TECHNOLOGICAL FIELD

Embodiments of the present disclosure relate generally to generating one or more monitoring operations.

BACKGROUND

Applicant has identified many technical challenges and difficulties associated with generating one or more monitoring operations. Through applied effort, ingenuity, and innovation, Applicant has solved problems related to generating one or more monitoring operations by developing solutions embodied in the present disclosure, which are described in detail below.

BRIEF SUMMARY

Various embodiments described herein relate to systems, apparatuses, methods, and computer program products for generating one or more monitoring operations.

In accordance with one aspect of the disclosure, a computer-implemented method for generating one or more monitoring operations is provided. In some embodiments, the computer-implemented method may include causing a component interface to be displayed on a user interface. In some embodiments, the component interface comprises one or more components of a computing application. In some embodiments, the computer-implemented method may include causing a modeling interface to be displayed on the user interface. In some embodiments, the computer-implemented method may include receiving a selection of at least one of the one or more components of the computing application. In some embodiments, the computer-implemented method may include in response to the selection of at least one of the one or more components of the computing application, causing an updated modeling interface to be displayed on the user interface. In some embodiments, the updated modeling interface comprises a computing application architecture model. In some embodiments, the computer-implemented method may include applying an analyzer scanning model to the computing application architecture model to generate the one or more monitoring operations.

In some embodiments, the computing application architecture model comprises at least one of the one or more components of the computing application.

In some embodiments, the computer-implemented method may include receiving an indication of acceptance of the one or more monitoring operations.

In some embodiments, the computer-implemented method may include receiving an indication of denial of the one or more monitoring operations.

In some embodiments, the computer-implemented method may include detecting one or more errors associated with the computing application based at least on the one or more monitoring operations.

In some embodiments, the computer-implemented method may include in response to detecting the one or more errors associated with the computing application transmitting an error message to a computing device associated with the computing application.

In some embodiments, the computing device is a remote computing device.

In some embodiments, the computer-implemented method may include in response to detecting the one or more errors associated with the computing application causing an error message interface to be displayed on the user interface.

In some embodiments, the one or more components of the computing application comprise one or more of a database component, a storage component, a network component, a data processing component, an internet of things component, or a miscellaneous component.

In some embodiments, the one or more monitoring operations are based at least in part on the selection of at least one of the one or more components of the computing application.

In accordance with another aspect of the disclosure, an apparatus for generating one or more monitoring operations is provided. In some embodiments, the apparatus for generating one or more monitoring operations may include at least one processor and at least one memory coupled to the at least one processor. In some embodiments, the at least one processor is configured to cause a component interface to be displayed on a user interface. In some embodiments, the component interface comprises one or more components of a computing application. In some embodiments, the at least one processor is configured to cause a modeling interface to be displayed on the user interface. In some embodiments, the at least one processor is configured to receive a selection of at least one of the one or more components of the computing application. In some embodiments, the at least one processor is configured to in response to the selection of at least one of the one or more components of the computing application, cause an updated modeling interface to be displayed on the user interface. In some embodiments, the updated modeling interface comprises a computing application architecture model. In some embodiments, the at least one processor is configured to apply an analyzer scanning model to the computing application architecture model to generate the one or more monitoring operations.

In some embodiments, the computing application architecture model comprises at least one of the one or more components of the computing application.

In some embodiments, the at least one processor is configured to receive an indication of acceptance of the one or more monitoring operations.

In some embodiments, the at least one processor is configured to receive an indication of denial of the one or more monitoring operations.

In some embodiments, the at least one processor is configured to detect one or more errors associated with the computing application based at least on the one or more monitoring operations.

In some embodiments, the at least one processor is configured to in response to detecting the one or more errors associated with the computing application transmit an error message to a computing device associated with the computing application.

In some embodiments, the computing device is a remote computing device.

In some embodiments, the at least one processor is configured to in response to detecting the one or more errors associated with the computing application cause an error message interface to be displayed on the user interface.

In some embodiments, the one or more components of the computing application comprise one or more of a database component, a storage component, a network component, a data processing component, an internet of things component, or a miscellaneous component.

In some embodiments, the one or more monitoring operations are based at least in part on the selection of at least one of the one or more components of the computing application.

In accordance with another aspect of the disclosure, a non-transitory computer-readable storage medium for generating one or more monitoring operations is provided. In some embodiments, the non-transitory computer-readable storage medium for generating one or more monitoring operations may include computer program code for execution by one or more processors of a device. In some embodiments, the computer program code configured to, when executed by the one or more processors, cause the device to cause a component interface to be displayed on a user interface. In some embodiments, the component interface comprises one or more components of a computing application. In some embodiments, the computer program code configured to, when executed by the one or more processors, cause the device to cause a modeling interface to be displayed on the user interface. In some embodiments, the computer program code configured to, when executed by the one or more processors, cause the device to receive a selection of at least one of the one or more components of the computing application. In some embodiments, the computer program code configured to, when executed by the one or more processors, cause the device to in response to the selection of at least one of the one or more components of the computing application, cause an updated modeling interface to be displayed on the user interface. In some embodiments, the updated modeling interface comprises a computing application architecture model. In some embodiments, the computer program code configured to, when executed by the one or more processors, cause the device to apply an analyzer scanning model to the computing application architecture model to generate the one or more monitoring operations.

In some embodiments, the computing application architecture model comprises at least one of the one or more components of the computing application.

In some embodiments, the computer program code configured to, when executed by the one or more processors, cause the device to receive an indication of acceptance of the one or more monitoring operations.

In some embodiments, the computer program code configured to, when executed by the one or more processors, cause the device to receive an indication of denial of the one or more monitoring operations.

In some embodiments, the computer program code configured to, when executed by the one or more processors, cause the device to detect one or more errors associated with the computing application based at least on the one or more monitoring operations.

In some embodiments, the computer program code configured to, when executed by the one or more processors, cause the device to in response to detecting the one or more errors associated with the computing application transmit an error message to a computing device associated with the computing application.

In some embodiments, the computing device is a remote computing device.

In some embodiments, the computer program code configured to, when executed by the one or more processors, cause the device to in response to detecting the one or more errors associated with the computing application cause an error message interface to be displayed on the user interface.

In some embodiments, the one or more components of the computing application comprise one or more of a database component, a storage component, a network component, a data processing component, an internet of things component, or a miscellaneous component.

In some embodiments, the one or more monitoring operations are based at least in part on the selection of at least one of the one or more components of the computing application.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 5 illustrates an example modeling interface in accordance with one or more embodiments of the present disclosure;

DETAILED DESCRIPTION

Figure 1:
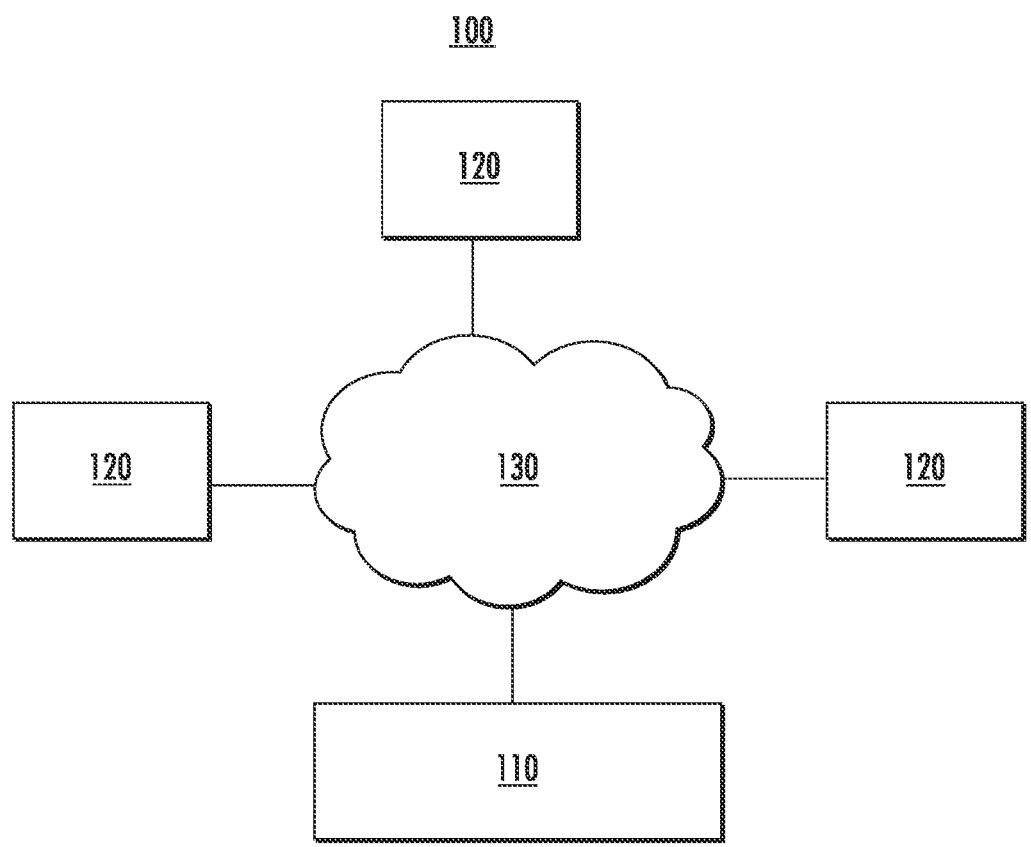
FIG. 1 illustrates an exemplary block diagram of an environment in which embodiments of the present disclosure may operate.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with generating one or more monitoring operations. As would be understood by one skilled in the field to which this disclosure pertains, there are numerous example scenarios in which a user may need to generate one or more monitoring operations.

In many computing applications, it is often necessary to monitor the computing application as the computing application is operating. For example, it may be necessary to monitor a computing application to ensure the computing application's robustness (e.g., the computing application is continuously able to perform all of the tasks that the computing application is designed to perform). As another example, it may be necessary to monitor a computing application to ensure the computing application's reliability (e.g., the computing application is able to perform all of the tasks that the computing application is designed to perform on a consistent basis). As another example, it may be necessary to monitor a computing application to ensure that any errors in the computing application are identified in a timely manner (e.g., errors are identified before damage is done to the computing application and/or end users of the computing application).

An example solution for monitoring a computing application includes, for example, monitoring various components of the computing application based on an ad hoc approach in order to evaluate the robustness and reliability of the computing application and/or identify any errors in the computing application. However, such an example solution for monitoring the computing application may fail to comprehensively evaluate the robustness and reliability of the computing application and/or identify any errors in the computing application in a timely manner due to the solution being ad hoc (e.g., the solution for monitoring the computing application may not identify errors in the computing application in a timely manner such that the errors cause damage to the computing application and/or end users of the computing application). Another example solution for monitoring a computing application includes, for example, evaluating the robustness and reliability of the computing application and/or identifying any errors in the computing application based on previous lapses in the robustness and reliability of the computing application and/or previous errors in the computing application. However, such an example solution for monitoring the computing application, fails to proactively evaluate the robustness and reliability of the computing application and/or identify any errors in the computing application, resulting in damage to the computing application and/or end users of the computing application.

Thus, to address these and/or other issues related to generating one or more monitoring operations, example systems, apparatuses, computer program products, and/or methods for generating one or more monitoring operations are disclosed herein. For example, an embodiment in this disclosure, described in greater detail below, includes a computer-implemented method for generating one or more monitoring operations. In some embodiments, the computer-implemented method may include causing a component interface to be displayed on a user interface. In some embodiments, the component interface comprises one or more components of a computing application. In some embodiments, the computer-implemented method may include causing a modeling interface to be displayed on the user interface. In some embodiments, the computer-implemented method may include receiving a selection of at least one of the one or more components of the computing application. In some embodiments, the computer-implemented method may include in response to the selection of at least one of the one or more components of the computing application, causing an updated modeling interface to be displayed on the user interface. In some embodiments, the updated modeling interface comprises a computing application architecture model. In some embodiments, the computer-implemented method may include applying an analyzer scanning model to the computing application architecture model to generate the one or more monitoring operations. Accordingly, the systems apparatuses, methods, and computer program products disclosed herein are able to monitor the computing application by generating one or more monitoring operations such that the robustness and reliability of the computing application can be proactively and comprehensively evaluated and any errors in the computing application can be identified in a timely manner.

Example Apparatuses and Systems

FIG. 1 illustrates an exemplary block diagram of an environment 100 in which embodiments of the present disclosure may operate. It will be appreciated that the environment 100 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an exemplary block diagram of an environment 100 in which embodiments of the present disclosure may operate, numerous other configurations may also be used to implement embodiments of the present disclosure.

The environment 100 may include an apparatus for generating one or more monitoring operations 110, which may be configured to generate one or more monitoring operations in accordance with one or more example embodiments disclosed herein. The apparatus for generating one or more monitoring operations 110 may comprise one or more servers, a server cluster, one or more network nodes, a cloud computing infrastructure, one or more desktop computers, one or more laptop computers, one or more mobile computing devices some combination thereof, or the like.

The environment 100 may include one or more computing devices 120. While three of the one or more computing devices 120 are illustrated in FIG. 1, it will be appreciated that this illustration is by way of example, and not by way of limitation, as the environment 100 may include additional one or more computing devices 120. The one or more computing devices 120 may be embodied as any computing device, such as by way of non-limiting example, a cellular phone, smart phone, communication device, tablet computing device, digital camera/camcorder, audio/video player, digital video recorder, mouse, keyboard, router, laptop computing device, desktop computing device, wearable computing device, internet of things computing device, "smart" appliances, mobile computing device, any combination thereof, and/or the like.

In various example embodiments, the apparatus for generating one or more monitoring operations 110 and the one or more computing devices 120 may be configured to connect to one or more networks 130 via a variety of wireless and/or wireline connections. For example, the apparatus for generating one or more monitoring operations 110 and the one or more computing devices 120 may be configured to access the network 130 via a cellular connection, wireless local area network connection, Ethernet connection, and/or the like. As such, the network 130 may comprise a wireline network, wireless network (e.g., a cellular network, wireless local area network, wireless wide area network, some combination thereof, or the like), or a combination thereof, and in some example embodiments comprises at least a portion of the Internet. Likewise, the apparatus for generating one or more monitoring operations 110 may connect to the one or more networks 130 and may receive any of the data and other information disclosed herein directly or indirectly from the one or more computing devices 120, including via one or more intermediary computing systems (not shown).

Figure 2:
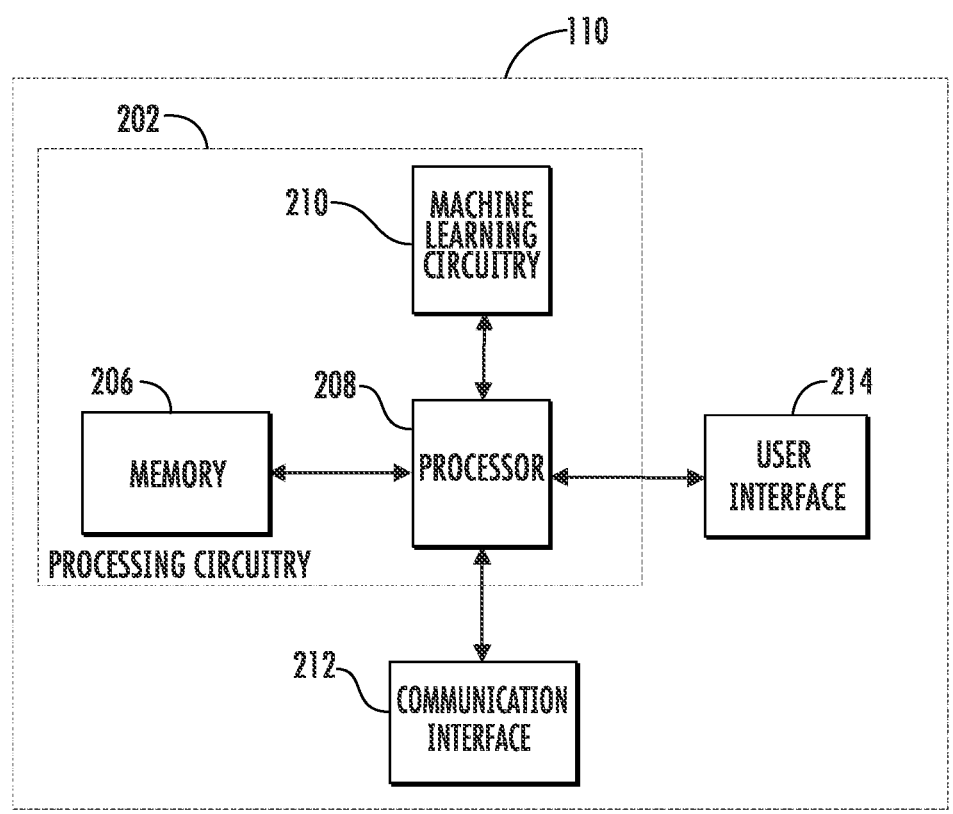
FIG. 2 illustrates an exemplary block diagram of an apparatus for generating one or more monitoring operations in accordance with one or more embodiments of the present disclosure.

FIG. 2 illustrates a block diagram of an apparatus for generating one or more monitoring operations 110 in accordance with some example embodiments. However, it should be noted that the components, devices, or elements illustrated in and described with respect to FIG. 2 below may not be mandatory and thus one or more may be omitted in certain embodiments. Additionally, some embodiments may include further or different components, devices, or elements beyond those illustrated in and described with respect to FIG. 2.

The apparatus for generating one or more monitoring operations 110 may be embodied as any computing device or devices, such as by way of non-limiting example a cellular phone, smart phone, communication device, tablet computing device, desktop computing device, mobile computing device, server or serve network, remote computing device, distributed cloud computing system, kiosks, input terminals, any combination thereof, or the like.

The apparatus for generating one or more monitoring operations 110 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the apparatus for generating one or more monitoring operations 110 in accordance with various example embodiments, and thus may provide means for performing functionalities of the apparatus for generating one or more monitoring operations 110 in accordance with various example embodiments. The processing circuitry 202 may be configured to perform data processing, application execution and/or other processing and management services according to one or more example embodiments. In some embodiments, the apparatus for generating one or more monitoring operations 110 or a portion(s) or component(s) thereof, such as the processing circuitry 202, may be embodied as or comprise a chip or chip set. In other words, the apparatus for generating one or more monitoring operations 110 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus for generating one or more monitoring operations 110 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein In some example embodiments, the processing circuitry 202 may include a processor 208 and, in some embodiments, such as that illustrated in FIG. 2, may further include memory 206 and machine learning circuitry 210. The processing circuitry 202 may be in communication with or otherwise control a communication interface 212 and/or a user interface 214. As such, the processing circuitry 202 may be embodied as a circuit chip (e.g., an integrated circuit chip) configured (e.g., with hardware, software or a combination of hardware and software) to perform operations described herein.

The processor 208 may be embodied in a number of different ways. For example, the processor 208 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 208 may comprise a plurality of processors. The plurality of processors may be in operative communication with each other and may be collectively configured to perform one or more functionalities of the apparatus for generating one or more monitoring operations 110 as described herein. The plurality of processors may be embodied on a single computing device or distributed across a plurality of computing devices collectively configured to function as the apparatus for generating one or more monitoring operations 110. In some example embodiments, the processor 208 may be configured to execute instructions stored in the memory 206 or otherwise accessible to the processor 208. As such, whether configured by hardware or by a combination of hardware and software, the processor 208 may represent an entity (e.g., physically embodied in circuitry—in the form of processing circuitry 202) capable of performing operations according to embodiments of the present disclosure while configured accordingly. Thus, for example, when the processor 208 is embodied as an ASIC, FPGA or the like, the processor 208 may be specifically configured hardware for conducting the operations described herein. Alternatively, as another example, when the processor 208 is embodied as an executor of software instructions, the instructions may specifically configure the processor 208 to perform one or more operations described herein.

In some example embodiments, the memory 206 may include one or more non-transitory memory devices such as, for example, volatile and/or non-volatile memory that may be either fixed or removable. In this regard, the memory 206 may comprise a non-transitory computer-readable storage medium. It will be appreciated that while the memory 206 is illustrated as a single memory, the memory 206 may comprise a plurality of memories. The plurality of memories may be embodied on a single computing device or may be distributed across a plurality of computing devices collectively configured to function as the apparatus for generating one or more monitoring operations 110. The memory 206 may be configured to store information, data, applications, instructions and/or the like for enabling the apparatus for generating one or more monitoring operations 110 to carry out various functions in accordance with one or more example embodiments. For example, the memory 206 may be configured to buffer input data for processing by the processor 208. Additionally or alternatively, the memory 206 may be configured to store instructions for execution by the processor 208. As yet another alternative, the memory 206 may include one or more databases that may store a variety of files, contents, or data sets. Among the contents of the memory 206, applications may be stored for execution by the processor 208 in order to carry out the functionality associated with each respective application. In some cases, the memory 206 may be in communication with one or more of the processor 208, communication interface 212, or the machine learning circuitry 210, or the user interface 214 via a bus(es) for passing information among components of the apparatus for generating one or more monitoring operations 110.

In some example embodiments, the machine learning circuitry 210 may include hardware components designed or configured to request, receive, process, generate, and transmit data, data structures, control signals, and electronic information for executing a trained machine learning model to generate the one or more monitoring operations. In some example embodiments, the memory 206 may be in communication with one or more of the memory 206, the processor 208, the communication interface 212, or the user interface 214 via a bus(es) for passing information among components of the apparatus for generating one or more monitoring operations 110.

In some example embodiments, the apparatus for generating one or more monitoring operations 110 may further include a communication interface 212. In some cases, the communication interface 212 may be any means such as a device or circuitry embodied in either hardware, or a combination of hardware and software that is configured to receive and/or transmit data from/to a network and/or any other device or circuitry in communication with the processing circuitry 202. By way of example, the communication interface 212 may be configured to enable the apparatus for generating one or more monitoring operations 110 to communicate with the one or more computing devices 120 and/or other computing devices via the network 130. Accordingly, the communication interface 212 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the apparatus for generating one or more monitoring operations 110 may further include a user interface 214. The user interface 214 may be in communication with the processing circuitry 202 to receive an indication of a user input at the user interface 214 (e.g., a user selection) and/or to provide an audible, visual, mechanical, and/or other output to the user. As such, the user interface 214 may include, for example, a keyboard, a mouse, a joystick, a display, a touch screen display, a microphone, a speaker, and/or other input/output mechanisms. As such, the user interface 214 may, in some example embodiments, provide means for a user to access and interact with the apparatus for generating one or more monitoring operations 110 in accordance with various example embodiments.

Figure 3:
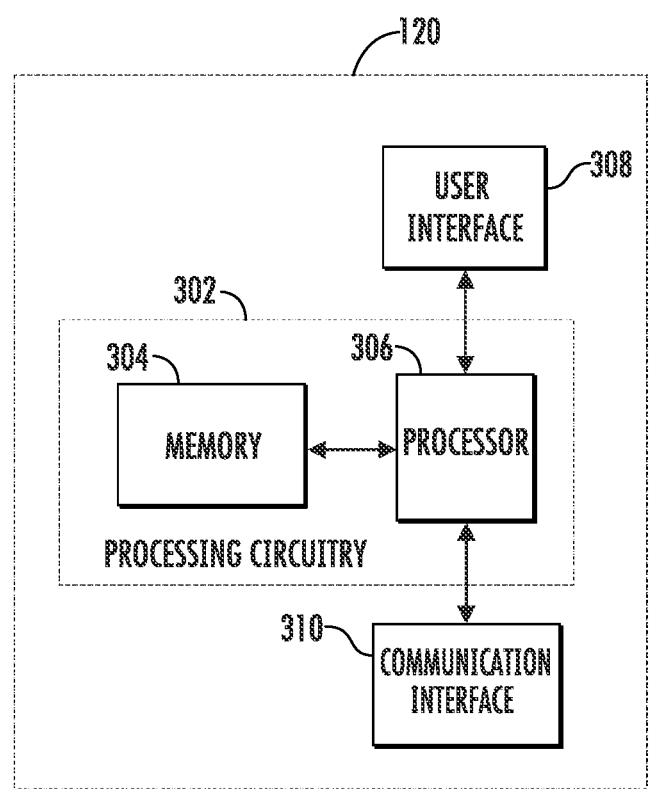
FIG. 3 illustrates an exemplary block diagram of a computing device in accordance with one or more embodiments of the present disclosure.

FIG. 3 illustrates a block diagram of each of the one or more computing devices 120 in accordance with some example embodiments. However, it should be noted that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

Referring now to FIG. 3, a block diagram of each of the one or more computing devices 120 is illustrated. As described above each of the one or more computing devices 120 may be embodied as any computing device, such as by way of non-limiting example, a cellular phone, smart phone, communication device, tablet computing device, digital camera/camcorder, audio/video player, digital video recorder, mouse, keyboard, router, laptop computing device, desktop computing device, wearable computing device, internet of things computing device, "smart" appliances, mobile computing device, any combination thereof, and/or the like.

In some embodiments, each of the one or more computing devices 120 may include or otherwise be in communication with processing circuitry 302 that is configurable to perform actions in accordance with one or more example embodiments disclosed herein. In this regard, the processing circuitry 302 may be configured to perform and/or control performance of one or more functionalities of each of the one or more computing devices 120 in accordance with various example embodiments, and thus may provide means for performing functionalities of each of the one or more computing devices 120 in accordance with various example embodiments. The processing circuitry 302 may be configured to perform data processing, application execution and/or other processing and management services according to one or more example embodiments. In some embodiments, each of the one or more computing devices 120 or a portion(s) or component(s) thereof, such as the processing circuitry 302, may be embodied as or comprise a chip or chip set. In other words, each of the one or more computing devices 120 or the processing circuitry 302 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In some embodiments, each of the one or more computing devices 120 or the processing circuitry 302 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 302 may include a processor 306 and, in some embodiments, such as that illustrated in FIG. 3, may further include memory 304. The processing circuitry 302 may be in communication with or otherwise control a user interface 308, and/or a communication interface 310. As such, the processing circuitry 302 may be embodied as a circuit chip (e.g., an integrated circuit chip) configured (e.g., with hardware, software or a combination of hardware and software) to perform operations described herein.

The processor 306 may be embodied in a number of different ways. For example, the processor 306 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 306 may comprise a plurality of processors. The plurality of processors may be in operative communication with each other and may be collectively configured to perform one or more functionalities of each of the one or more computing devices 120 as described herein. In some example embodiments, the processor 306 may be configured to execute instructions stored in the memory 304 or otherwise accessible to the processor 306. As such, whether configured by hardware or by a combination of hardware and software, the processor 306 may represent an entity (e.g., physically embodied in circuitry—in the form of processing circuitry 302) capable of performing operations according to embodiments of the present disclosure while configured accordingly. Thus, for example, when the processor 306 is embodied as an ASIC, FPGA or the like, the processor 306 may be specifically configured hardware for conducting the operations described herein. Alternatively, as another example, when the processor 306 is embodied as an executor of software instructions, the instructions may specifically configure the processor 306 to perform one or more operations described herein.

In some example embodiments, the memory 304 may include one or more non-transitory memory devices such as, for example, volatile and/or non-volatile memory that may be either fixed or removable. In this regard, the memory 304 may comprise a non-transitory computer-readable storage medium. It will be appreciated that while the memory 304 is illustrated as a single memory, the memory 304 may comprise a plurality of memories. The memory 304 may be configured to store information, data, applications, instructions and/or the like for enabling each of the one or more computing devices 120 to carry out various functions in accordance with one or more example embodiments. For example, the memory 304 may be configured to buffer input data for processing by the processor 306. Additionally or alternatively, the memory 304 may be configured to store instructions for execution by the processor 306. As yet another alternative, the memory 304 may include one or more databases that may store a variety of files, contents or data sets. Among the contents of the memory 304, applications may be stored for execution by the processor 306 in order to carry out the functionality associated with each respective application. In some cases, the memory 304 may be in communication with one or more of the processor 306, user interface 308, and/or communication interface 310 via a bus(es) for passing information among components of each of the one or more computing devices 120.

The user interface 308 may be in communication with the processing circuitry 302 to receive an indication of a user input at the user interface 308 (e.g., a user selection) and/or to provide an audible, visual, mechanical or other output to the user. As such, the user interface 308 may include, for example, a keyboard, a mouse, a joystick, a display, a touch screen display, a microphone, a speaker, and/or other input/output mechanisms. As such, the user interface 308 may, in some example embodiments, provide means for a user to access and interact with each of the one or more computing devices 120 and/or the apparatus for generating one or more monitoring operations 110 in accordance with various example embodiments.

The communication interface 310 may include one or more interface mechanisms for enabling communication with other devices and/or networks. In some cases, the communication interface 310 may be any means such as a device or circuitry embodied in either hardware, or a combination of hardware and software that is configured to receive and/or transmit data from/to a network and/or any other device or module in communication with the processing circuitry 302. By way of example, the communication interface 310 may be configured to enable each of the one or more computing devices 120 to communicate with the apparatus for generating one or more monitoring operations 110 and/or other computing devices via the network 130. Accordingly, the communication interface 310 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

With reference to FIGS. 1-8, in some embodiments, the apparatus for generating one or more monitoring operations 110 may be configured to cause a component interface 400 to be displayed on a user interface (e.g., the user interface 214 of the apparatus for generating one or more monitoring operations 110). In some embodiments, each of the components displayed in the component interface 400 may be a component of a computing application. Said differently, for example, each component displayed in the component interface 400 may represent a building block of a computing application. For example, the components displayed in the component interface 400 may be components of a computing application operated by, interacted with by, and/or associated with the apparatus for generating one or more monitoring operations 110 and/or the one or more computing devices 120 (e.g., a computing application for processing data related to one or more industrial processes associated with the one or more computing devices 120).

In some embodiments, the component interface 400 displayed on the user interface may include one or more database components 402, storage components 404, network components 406, data processing components 408, internet of things components 410, and/or miscellaneous components 412. Said differently, the component interface 400 may include one or more categories of components of a computing application, such as one or more database components 402, storage components 404, network components 406, data processing components 408, internet of things components 410, and/or miscellaneous components 412.

In some embodiments, for example, the database components 402 may include one or more of a relational database component (e.g., PostgreSQL), a relational database management system component (e.g., SQL server), a NoSQL database component (e.g., Azure® Cosmos database), a time series database component (e.g., Druid database), and/or the like. In some embodiments, for example the storage components 404 may include one or more of a data lake 1 component (e.g., Azure® Data Lake Storage Generation I (ADLS Gen I)), a data lake 2 component (e.g., Azure® Data Lake Storage Generation II (ADLS Gen II)), a storage layer component (e.g., Delta Lake), a storage account component, a container component, a key vault component, and/or the like. In some embodiments, for example the network components 406 may include one or more of a firewall boundary component, a cloud computing environment boundary component (e.g., Azure® boundary), a virtual network component, a corporate network component, and/or the like. In some embodiments, for example the data processing components 408 may include one or more of data processing engine 1 component (e.g., Azure® Synapse), data processing engine 2 component (e.g., Apache® Spark), data processing engine 3 component (e.g., HD Insight®), data processing engine 4 component (e.g., Databricks®), data processing engine 5 component (e.g., Azure® Data Explorer), a data integration and transformation component (e.g., Azure® Data Factory), and/or the like. In some embodiments, for example the internet of things (IoT) components 410 may include one or more of an IoT hub component, a kafka cluster component, an IoT cloud gateway component, an IoT device component, and/or the like. In some embodiments, for example the miscellaneous components 412 may include one or more of a data visualization component (e.g., Power BI®), a virtual machine component (e.g., Azure® virtual machine), a self-hosted integrated runtime (SHIR) component, a miscellaneous services component, and/or the like. In some embodiments, individual components may be displayed in only one of the categories of components displayed on the component interface 400. Additionally or alternatively, individual components may be displayed in more than one of the categories of components displayed on the component interface 400.

Figure 4:
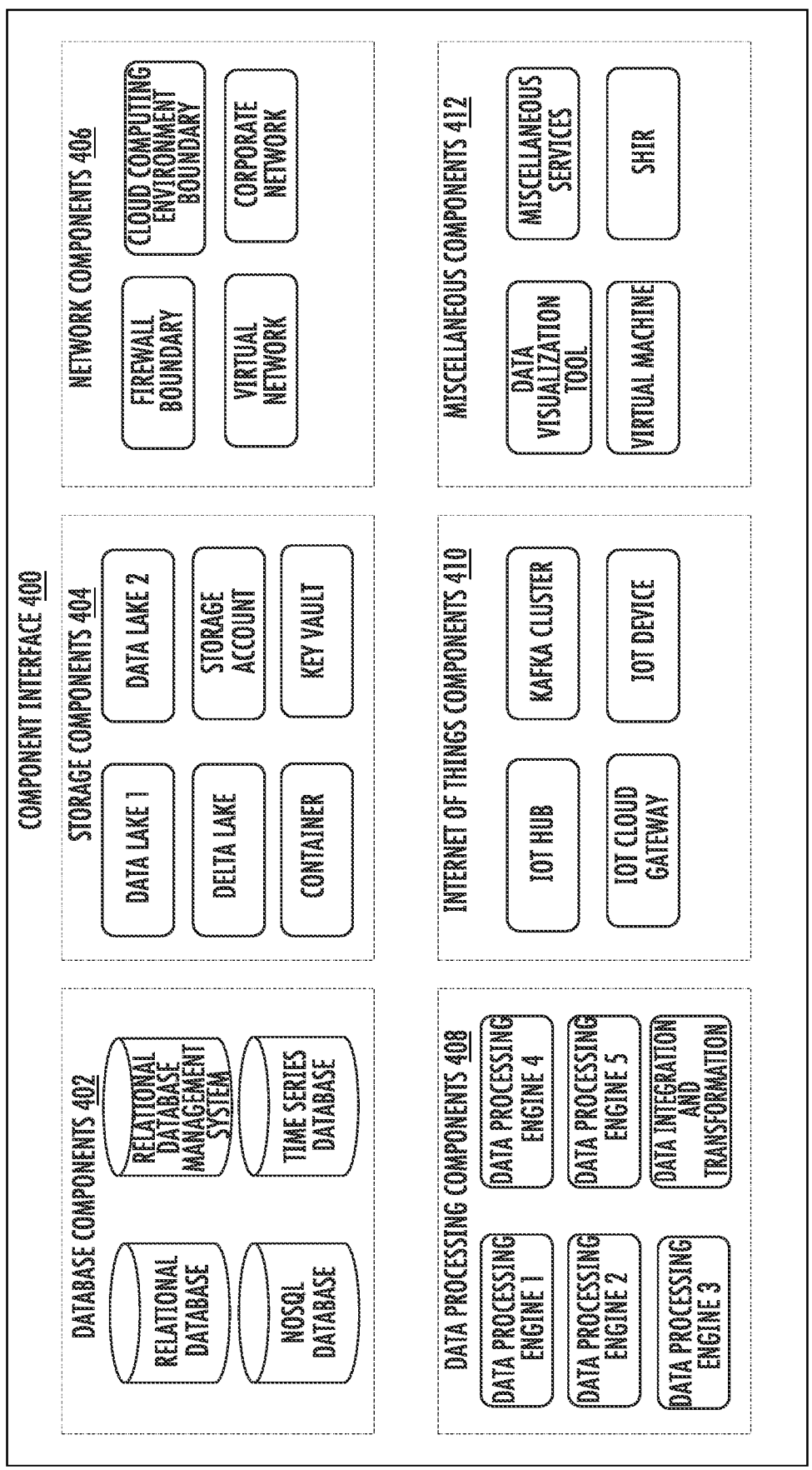
FIG. 4 illustrates an example component interface in accordance with one or more embodiments of the present disclosure.
Figure 6:
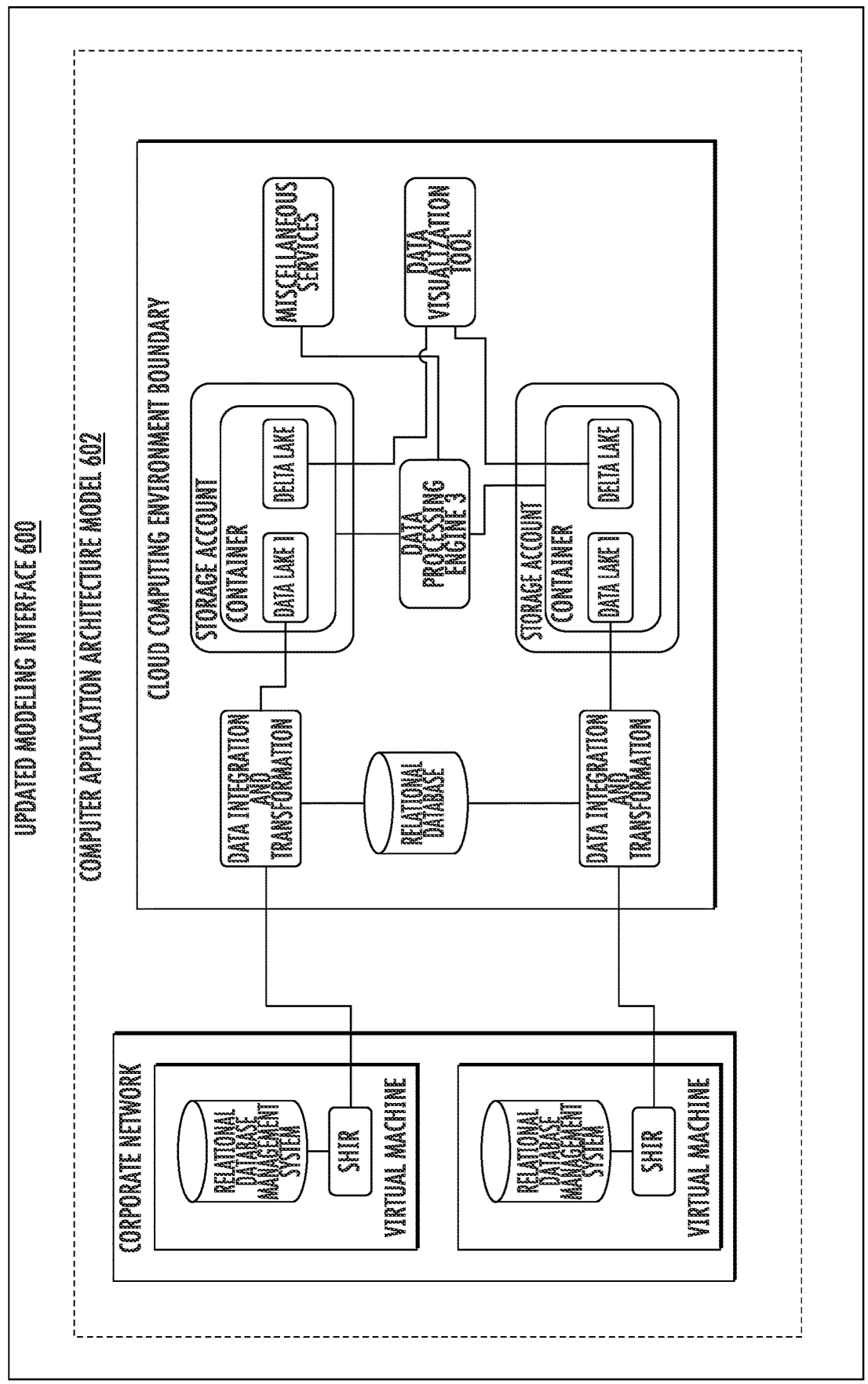
FIG. 6 illustrates an example updated modeling interface in accordance with one or more embodiments of the present disclosure.

Although depicted in FIG. 4 as the component interface 400 displayed on the user interface including one or more database components 402, storage components 404, network components 406, data processing components 408, internet of things components 410, and/or miscellaneous components 412, it would be understood by one skilled in the field to which this disclosure pertains that the component interface 400 displayed on the user interface may include other components not illustrated in FIG. 4 and/or may not include some of the components illustrated in FIG. 4.

In some embodiments, the apparatus for generating one or more monitoring operations 110 may be configured to cause a modeling interface 500 to be displayed on a user interface (e.g., the user interface 214 of the apparatus for generating one or more monitoring operations 110). In some embodiments, the modeling interface 500 may include an instruction to create a computing application architecture model 602 using the modeling interface 500. In some embodiments, the component interface 400 and the modeling interface 500 may be configured to be displayed simultaneously on the user interface 214 of the apparatus for generating one or more monitoring operations 110. For example, the component interface 400 and the modeling interface 500 may be configured to be displayed side by side on the user interface 214 of the apparatus for generating one or more monitoring operations 110.

In some embodiments, the apparatus for generating one or more monitoring operations 110 may be configured to receive a selection of one or more of the components of the computing application displayed on the component interface 400. For example, a user of the apparatus for generating one or more monitoring operations 110 may select a component of the computing application from the component interface 400 (e.g., the data integration and transformation component from the data processing components 408).

In some embodiments, the apparatus for generating one or more monitoring operations 110 may be configured to cause an updated modeling interface 600 to be displayed on a user interface (e.g., the user interface 214 of the apparatus for generating one or more monitoring operations 110). In some embodiments, the apparatus for generating one or more monitoring operations 110 may be configured to cause an updated modeling interface 600 to be displayed on the user interface in response to a selection of at least one of the one or more components of the computing application displayed on the component interface 400. For example, a user may select the cloud computing environment boundary component from the component interface 400 and, in response to this selection, the apparatus for generating one or more monitoring operations 110 may be configured to cause an updated modeling interface 600 to be displayed on a user interface that includes the on cloud computing environment boundary component.

In some embodiments, the updated modeling interface 600 may include a computing application architecture model 602 (e.g., once all of the components associated with the computing application have been selected from the component interface 400). In some embodiments, the computing application architecture model 602 may be a representation of the computing application (e.g., the computing application architecture model 602 is a model of the computing application built from the components included in the component interface 400). In this regard, for example, the computing application architecture model 602 may include at least one of the one or more components of the computing application. For example, if the computing application includes a time series database component, the computing application architecture model 602 includes a time series database component. Said differently, the computing application architecture model 602 may include a representation of components of the computing application.

In some embodiments, the apparatus for generating one or monitoring operations 110 may be configured to apply an analyzer scanning model to the computing application architecture model 602 to generate the one or more monitoring operations. In some embodiments, the analyzer scanning model may comprise one or more of a statistical model, an algorithmic model, and/or a machine learning model (e.g., using machine learning circuitry 210). In some embodiments, the monitoring operations generated by the analyzer scanning model may be operations that the apparatus for generating one or more monitoring operations 110 and/or the one or more computing devices 120 are configured to perform when the computing application is operating.

For example, if the computing application includes a data visualization tool component, such as shown in the computing application architecture model 602, the analyzer scanning model may be configured to generate a monitoring operation that includes monitoring whether the data visualization tool component receives updated data during a first time period (e.g., the data visualization tool component may need to receive updated data every 24 hours to operate without causing an error). In this regard, for example, the monitoring operation may monitor whether the data visualization tool component receives updated data from a data source, such as the delta lake component, during the first time period. In this regard, for example, the analyzer scanning model may be configured to generate the one or more monitoring operations based at least in part on the one or more components of the computing application (e.g., the components of the computing application being the components in the computing application architecture model 602 displayed on the updated modeling interface 600).

Figure 7:
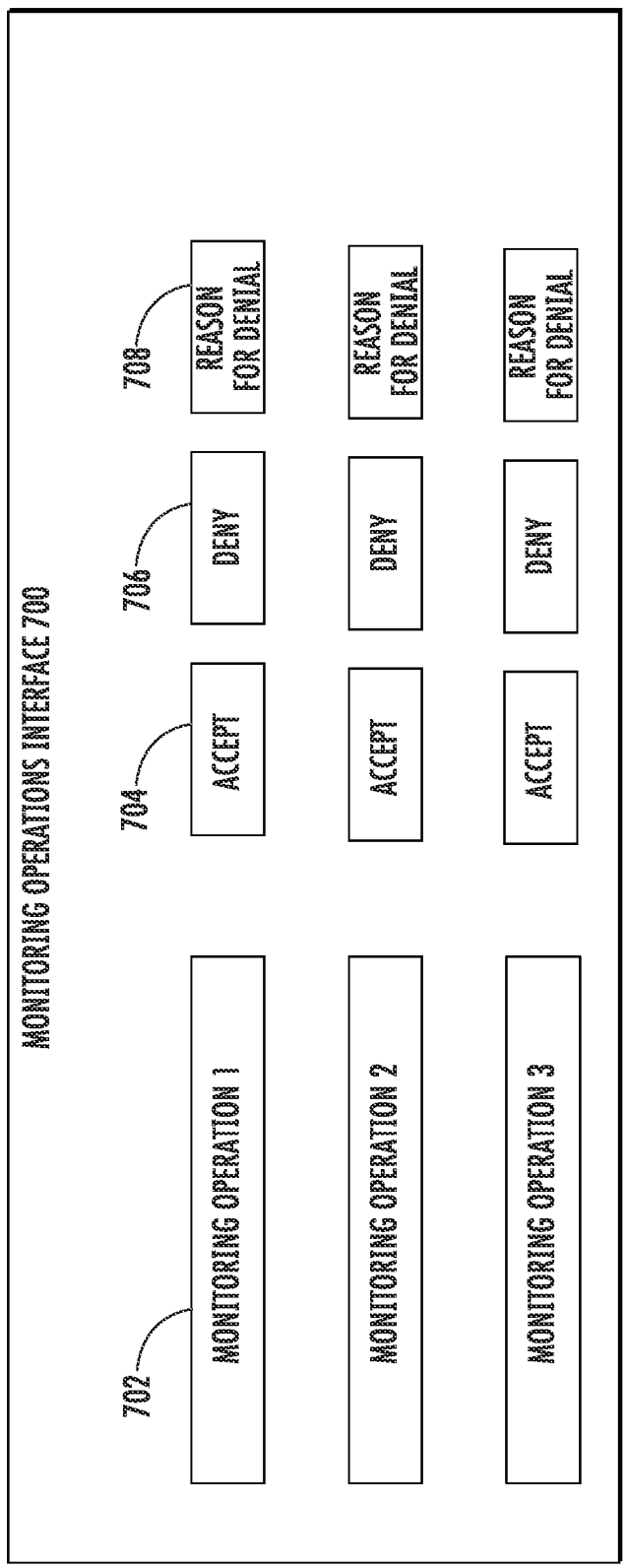
FIG. 7 illustrates an example monitoring operations interface in accordance with one or more embodiments of the present disclosure.
Figure 8:
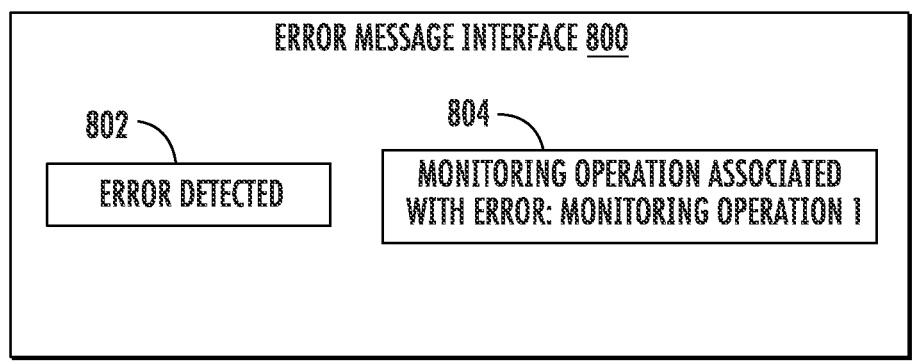
FIG. 8 illustrates an example error message interface in accordance with one or more embodiments of the present disclosure.

In some embodiments, the apparatus for generating one or monitoring operations 110 may be configured to cause a monitoring operations interface 700 to be displayed on a user interface (e.g., user interface 214). In this regard, for example, the monitoring operations interface 700 may include the one or more monitoring operations components 702 generated by the analyzer scanning model. For example, as illustrated in FIG. 7, the monitoring operations interface 700 may display three monitoring operations components 702 if the analyzer scanning model generated three monitoring operations when it was applied to computing application architecture model 602.

In some embodiments, the monitoring operations interface 700 may include an accept component 704 associated with each of the generated monitoring operations. In some embodiments, the apparatus for generating one or more monitoring operations 110 may be configured to receiving an indication of acceptance of one or more of the one or more monitoring operations. In this regard, for example, the indication of acceptance of the one or more monitoring operations may cause the apparatus for generating one or more monitoring operations 110 and/or the one or more computing devices 120 to perform the accepted monitoring operation when the computing application is operating (e.g., the apparatus for generating one or more monitoring operations 110 and/or the one or more computing devices 120 will monitor to determine whether the data visualization tool component receives updated data every 24 hours).

In some embodiments, the monitoring operations interface 700 may include a deny component 706 associated with each of the generated monitoring operations. In some embodiments, the apparatus for generating one or more monitoring operations 110 may be configured to receiving an indication of denial of one or more of the one or more monitoring operations. In this regard, for example, the indication of denial of the one or more monitoring operations may cause the apparatus for generating one or more monitoring operations 110 and/or the one or more computing devices 120 to not perform the denied monitoring operation when the computing application is operating (e.g., the apparatus for generating one or more monitoring operations 110 and/or the one or more computing devices 120 will not monitor to determine whether the data visualization tool component receives updated data every 24 hours).

In some embodiments, the monitoring operations interface 700 may include a reason for denial component 708 associated with each of the generated monitoring operations. In some embodiments, the apparatus for generating one or more monitoring operations 110 may be configured to receiving an input indicating why one or more of the one or more monitoring operations were denied via the reason for denial component 708. In this regard, for example, the input indicating why one or more of the one or more monitoring operations were denied may provide context on why the one or more of the one or more monitoring operations were denied. For example, the input may indicate that the monitoring operations would consume too much computing power.

In some embodiments, the apparatus for generating one or more monitoring operations 110 may be configured to monitor the computing application when the computing application is operating based at least in part on the one or more monitoring operations generated by the apparatus for generating one or monitoring operations 110. In this regard, for example, the apparatus for generating one or more monitoring operations 110 may be configured to detect one or more errors associated with the computing application based at least in part on the one or more monitoring operations. For example, if one of the one or more monitoring operations determines that the data visualization tool component has not received updated data from a data source, such as the delta lake component, during the first time period, the apparatus for generating one or monitoring operations 110 may detect one or more errors associated with the computing application.

In some embodiments, in response to detecting one or more errors associated with the computing application, the apparatus for generating one or more monitoring operations 110 may be configured to cause an error message interface 800 to be displayed on the user interface (e.g., user interface 214). In some embodiments, the error message interface 800 may include an error detected component 802 indicating that an error associated with the computing application has been detected. In some embodiments, the error message interface 800 may include a monitoring operation associated with error component 804. In this regard, for example, the monitoring operation associated with error component 804 may indicate which of the one or more monitoring errors the detected error associated with the computing application is associated with. For example, the monitoring operation associated with error component 804 may indicate that the error associated with the computing application is associated with a monitoring operation configured to monitor if the data visualization tool component has received updated data from a data source during the first time period.

In some embodiments, in response to detecting the one or more errors associated with the computing application, the apparatus for generating one or more monitoring operations 110 may be configured to transmit an error message to the one or more computing devices 120. In this regard, for example, the apparatus for generating one or more monitoring operations 110 may be configured to inform the one or more computing devices 120 that there is an error associated with the computing application. For example, the error message may indicate that there is an error associated with the data visualization tool component. As another example, the error message may indicate that any data associated with the data visualization tool component should not be relied upon by the one or more computing devices 120. As another example, the error message may indicate that the data visualization tool component should not be used by the one or more computing devices 120.

EXAMPLE METHODS

Figure 9:
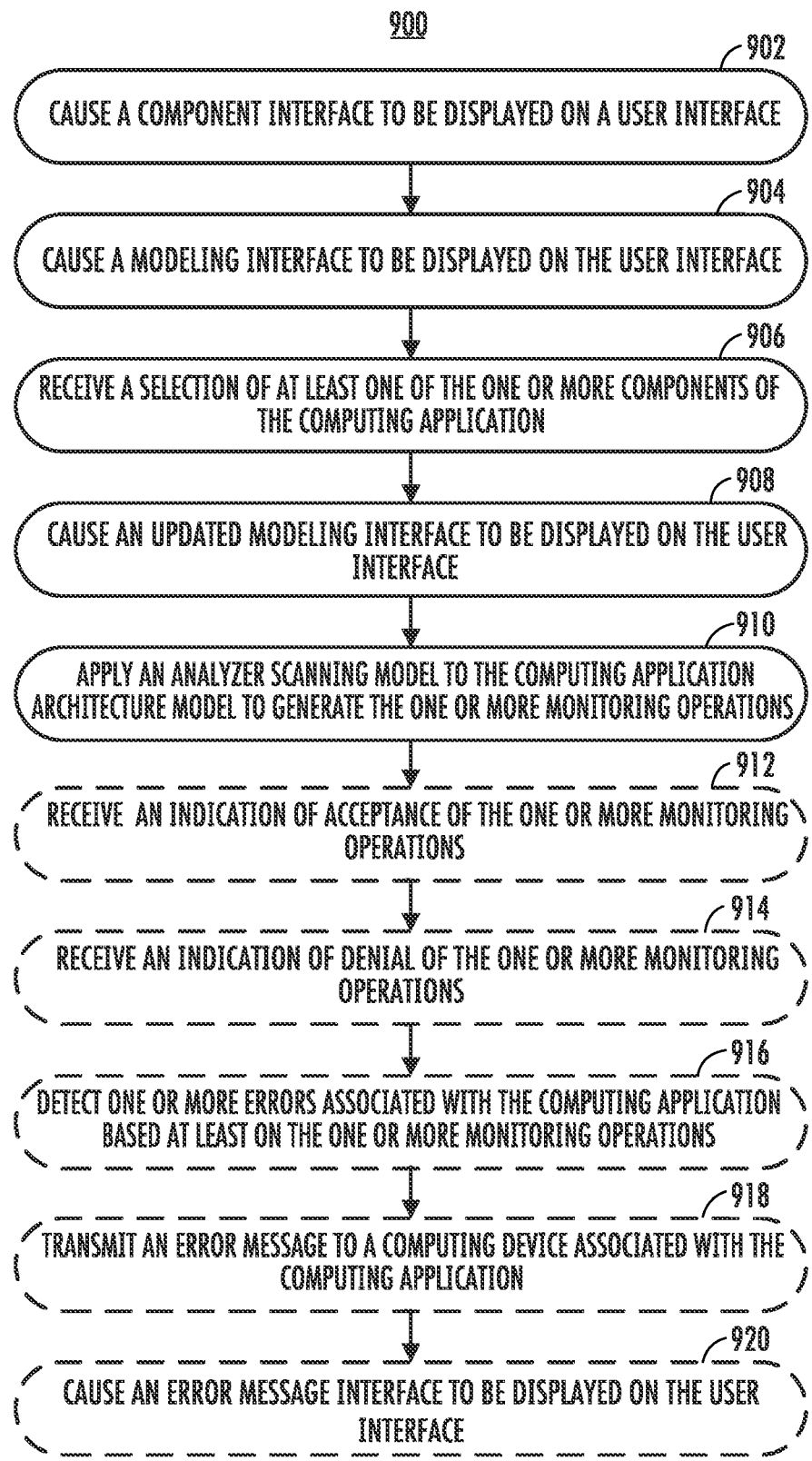
FIG. 9 illustrates a flowchart of an example method for generating one or more monitoring operations in accordance with one or more embodiments of the present disclosure.

Referring now to FIG. 9, a flowchart providing an example computer-implemented method for generating one or more monitoring operations 900 is illustrated. In this regard, FIG. 9 illustrates operations that may be performed by the apparatus for generating one or more monitoring operations 110 and/or components of the apparatus for generating one or more monitoring operations 110.

As shown in block 902, the computer-implemented method for generating one or more monitoring operations 900 may include causing a component interface to be displayed on a user interface. As described above, in some embodiments, each of the components displayed in the component interface may be a component of a computing application. Said differently, for example, each component displayed in the component interface may represent a building block of a computing application.

As described above, in some embodiments, the component interface displayed on the user interface may include one or more database components, storage components, network components, data processing components, internet of things components, and/or miscellaneous components. Said differently, the component interface may include one or more categories of components of a computing application, such as one or more database components, storage components, network components, data processing components, internet of things components, and/or miscellaneous components.

As described above, in some embodiments, for example, the database components may include one or more of a relational database component (e.g., PostgreSQL), a relational database management system component (e.g., SQL server), a NoSQL database component (e.g., Azure® Cosmos database), a time series database component (e.g., Druid database), and/or the like. In some embodiments, for example the storage components may include one or more of a data lake 1 component (e.g., Azure® Data Lake Storage Generation I (ADLS Gen I)), a data lake 2 component (e.g., Azure® Data Lake Storage Generation II (ADLS Gen II)), a storage layer component (e.g., Delta Lake), a storage account component, a container component, a key vault component, and/or the like. In some embodiments, for example the network components may include one or more of a firewall boundary component, a cloud computing environment boundary component (e.g., Azure® boundary), a virtual network component, a corporate network component, and/or the like. In some embodiments, for example the data processing components may include one or more of data processing engine 1 component (e.g., Azure® Synapse), data processing engine 2 component (e.g., Apache® Spark), data processing engine 3 component (e.g., HD Insight®), data processing engine 4 component (e.g., Databricks®), data processing engine 5 component (e.g., Azure® Data Explorer), a data integration and transformation component (e.g., Azure® Data Factory), and/or the like. In some embodiments, for example the internet of things components may include one or more of an internet of things (IoT) hub component, a kafka cluster component, an IoT cloud gateway component, an IoT device component, and/or the like. In some embodiments, for example the miscellaneous components may include one or more of a data visualization component (e.g., Power BI®), a virtual machine component (e.g., Azure® virtual machine), a self-hosted integrated runtime (SHIR) component, a miscellaneous services component, and/or the like. As described above, in some embodiments, individual components may be displayed in only one of the categories of components displayed on the component interface. Additionally or alternatively, individual components may be displayed in more than one of the categories of components displayed on the component interface.

As shown in block 904, the computer-implemented method for generating one or more monitoring operations 900 may include causing a modeling interface to be displayed on the user interface. As described above, in some embodiments, the modeling interface may include an instruction to create a computing application architecture model using the modeling interface. In some embodiments, the component interface and the modeling interface may be configured to be displayed simultaneously. For example, the component interface may be configured to be displayed side by side with the modeling interface.

As shown in block 906, the computer-implemented method for generating one or more monitoring operations 900 may include receiving a selection of at least one of the one or more components of the computing application. As described above, in some embodiments, for example, a user may select a component of the computing application from the component interface (e.g., the data integration and transformation component from the data processing components).

As shown in block 908, the computer-implemented method for generating one or more monitoring operations 900 may include in response to the selection of at least one of the one or more components of the computing application, causing an updated modeling interface to be displayed on the user interface. As described above, in some embodiments, As shown in block 910, the computer-implemented method for generating one or more monitoring operations 900 may include applying an analyzer scanning model to the computing application architecture model to generate the one or more monitoring operations. As described above, in some embodiments, an updated modeling interface may be caused to be displayed on the user interface in response to a selection of at least one of the one or more components of the computing application displayed on the component interface. For example, a user may select the cloud computing environment boundary component from the component interface and, in response to this selection, an updated modeling interface may be caused to be displayed on a user interface that includes the cloud computing environment boundary component.

As described above, in some embodiments, the updated modeling interface may include a computing application architecture model (e.g., once all of the components associated with the computing application have been selected from the component interface). In some embodiments, the computing application architecture model may be a representation of the computing application (e.g., the computing application architecture model is a model of the computing application built from the components included in the component interface). In this regard, for example, the computing application architecture model may include at least one of the one or more components of the computing application. For example, if the computing application includes a time series database component, the computing application architecture model includes a time series database component. Said differently, the computing application architecture model may include a representation of components of the computing application.

As shown in block 912, the computer-implemented method for generating one or more monitoring operations 900 may optionally include receiving an indication of acceptance of the one or more monitoring operations. As described above, in some embodiments, the analyzer scanning model may comprise one or more of a statistical model, an algorithmic model, and/or a machine learning model. In some embodiments, the monitoring operations generated by the analyzer scanning model may be operations that are configured to be performed when the computing application is operating. For example, if the computing application includes a data visualization tool component, such as shown in the computing application architecture model, the analyzer scanning model may be configured to generate a monitoring operation that includes monitoring whether the data visualization tool component receives updated data during a first time period (e.g., the data visualization tool component may need to receive updated data every 24 hours to operate without causing an error). In this regard, for example, the monitoring operation may monitor whether the data visualization tool component receives updated data from a data source, such as the delta lake component, during the first time period. In this regard, for example, the analyzer scanning model may be configured to generate the one or more monitoring operations based at least in part on the one or more components of the computing application (e.g., the components of the computing application being the components in the computing application architecture model displayed on the updated modeling interface).

As shown in block 914, the computer-implemented method for generating one or more monitoring operations 900 may optionally include receiving an indication of denial of the one or more monitoring operations. As described above, in some embodiments, a monitoring operations interface may include the one or more monitoring operations components generated by the analyzer scanning model. For example, the monitoring operations interface may display three monitoring operations components if the analyzer scanning model generated three monitoring operations when it was applied to computing application architecture model.

As described above, in some embodiments, the monitoring operations interface may include an accept component associated with each of the generated monitoring operations. In some embodiments, the indication of acceptance of the one or more monitoring operations may cause the accepted monitoring operation to be performed when the computing application is operating. As described above, in some embodiments, the indication of denial of the one or more monitoring operations may cause the denied monitoring operation to not be performed when the computing application is operating.

As described above, in some embodiments, the monitoring operations interface may include a reason for denial component associated with each of the generated monitoring operations. In some embodiments, the reason for denial component may be configured to receive an input indicating why one or more of the one or more monitoring operations were denied via the reason for denial component. In this regard, for example, the input indicating why one or more of the one or more monitoring operations were denied may provide context on why the one or more of the one or more monitoring operations were denied. For example, the input may indicate that the monitoring operations would consume too much computing power.

As shown in block 916, the computer-implemented method for generating one or more monitoring operations 900 may optionally include detecting one or more errors associated with the computing application based at least on the one or more monitoring operations. As described above, in some embodiments, the computer application may be monitored when the computing application is operating based at least in part on the one or more monitoring operations. In this regard, for example, the one or more errors associated with the computing application the one or more errors may be detected based at least in part on the one or more monitoring operations. For example, if one of the one or more monitoring operations determines that the data visualization tool component has not received updated data from a data source, such as the delta lake component, during the first time period, one or more errors associated with the computing application may be detected.

As shown in block 918, the computer-implemented method for generating one or more monitoring operations 900 may optionally include in response to detecting the one or more errors associated with the computing application transmitting an error message to a computing device associated with the computing application. As described above, in some embodiments, in response to detecting one or more errors associated with the computing application based at least on the one or more monitoring operations an error message interface may be displayed on a user interface. In some embodiments, the error message interface may include an error detected component indicating that an error associated with the computing application has been detected. In some embodiments, the error message interface may include a monitoring operation associated with error component. In this regard, for example, the monitoring operation associated with error component may indicate which of the one or more monitoring errors the detected error associated with the computing application is associated with. For example, the monitoring operation associated with error component may indicate that the error associated with the computing application is associated with a monitoring operation configured to monitor if the data visualization tool component has received updated data from a data source during the first time period.

As shown in block 920, the computer-implemented method for generating one or more monitoring operations 900 may optionally include in response to detecting the one or more errors associated with the computing application causing an error message interface to be displayed on the user interface. As described above, in some embodiments, in response to detecting the one or more errors associated with the computing application, an error message may be transmitted to the one or more computing devices. In this regard, for example, the error message may be configured to inform the one or more computing devices that there is an error associated with the computing application. For example, the error message may indicate that there is an error associated with the data visualization tool component. As another example, the error message may indicate that any data associated with the data visualization tool component should not be relied upon by the one or more computing devices. As another example, the error message may indicate that the data visualization tool component should not be used by the one or more computing devices.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A computer-implemented method for generating one or more monitoring operations, the method comprising:
   causing a component interface to be displayed on a user interface, wherein the component interface comprises one or more components of a computing application;
   causing a modeling interface to be displayed on the user interface;
   receiving a selection of at least one of the one or more components of the computing application;
   in response to the selection of at least one of the one or more components of the computing application, causing an updated modeling interface to be displayed on the user interface, wherein the updated modeling interface comprises a computing application architecture model;
   applying an analyzer scanning model to the computing application architecture model;
   generating, using the analyzer scanning model, the one or more monitoring operations automatically based on at least in part on the one or more components of the computing application; and
   displaying a monitoring interface associated with the one or more monitoring operations, wherein the monitoring interface comprises at least an acceptance component, a denial component, and a reason for the denial component associated with each of the one or more monitoring operations, wherein the one or more monitoring operations comprises at least receiving an input indicating a reason for a denial of one or more monitoring operations via the reason for denial component.

2. The computer-implemented method of claim 1, wherein the computing application architecture model comprises at least one of the one or more components of the computing application.

3. The computer-implemented method of claim 1, further comprising:
   receiving an indication of acceptance of the one or more monitoring operations.

4. The computer-implemented method of claim 1, further comprising:
   receiving an indication of denial of the one or more monitoring operations.

5. The computer-implemented method of claim 1, further comprising:
   detecting one or more errors associated with the computing application based at least on the one or more monitoring operations.

6. The computer-implemented method of claim 5, further comprising:
   in response to detecting the one or more errors associated with the computing application transmitting an error message to a computing device associated with the computing application, wherein the computing device is a remote computing device.

7. The computer-implemented method of claim 5, further comprising:
   in response to detecting the one or more errors associated with the computing application causing an error message to be displayed on the user interface.

8. The computer-implemented method of claim 1, wherein the one or more components of the computing application comprise one or more of a database component, a storage component, a network component, a data processing component, an internet of things component, or a miscellaneous component.

9. The computer-implemented method of claim 1, wherein the one or more monitoring operations are based at least in part on the selection of at least one of the one or more components of the computing application.

10. The computer-implemented method of claim 1, wherein the one or more monitoring operations comprise at least monitoring whether a selected component of the one or more components of the computing application receives updated data from a data source during a first time period, and
    wherein the one or more monitoring operations further comprises at least detecting one or more errors associated with the computing application in absence of the updated data during the first time period.

11. An apparatus for generating one or more monitoring operations, the apparatus comprising at least one processor and at least one memory coupled to the at least one processor, wherein the at least one processor is configured to:
    cause a component interface to be displayed on a user interface, wherein the component interface comprises one or more components of a computing application;
    cause a modeling interface to be displayed on the user interface;
    receive a selection of at least one of the one or more components of the computing application;
    in response to the selection of at least one of the one or more components of the computing application, cause an updated modeling interface to be displayed on the user interface, wherein the updated modeling interface comprises a computing application architecture model;
    apply an analyzer scanning model to the computing application architecture model:
    generate, using the analyzer scanning model, the one or more monitoring operations automatically based on at least in part on the one or more components of the computing application; and
    display a monitoring interface associated with the one or more monitoring operations, wherein the monitoring interface comprises at least an acceptance component, a denial component, and a reason for the denial component associated with each of the one or more monitoring operations, wherein the one or more monitoring operations comprises at least receiving an input indicating a reason for a denial of one or more monitoring operations via the reason for denial component.

12. The apparatus of claim 11, wherein the computing application architecture model comprises at least one of the one or more components of the computing application.

13. The apparatus of claim 11, wherein the at least one processor is configured to:
    receiving an indication of acceptance of the one or more monitoring operations.

14. The apparatus of claim 11, wherein the at least one processor is configured to:
    receiving an indication of denial of the one or more monitoring operations.

15. The apparatus of claim 11, wherein the at least one processor is configured to:

detecting one or more errors associated with the computing application based at least on the one or more monitoring operations.

16. The apparatus of claim 15, wherein the at least one processor is configured to:

in response to detecting the one or more errors associated with the computing application transmitting an error message to a computing device associated with the computing application.

17. The apparatus of claim 15, wherein the at least one processor is configured to:

in response to detecting the one or more errors associated with the computing application causing an error message to be displayed on the user interface.

18. The apparatus of claim 11, wherein the one or more components of the computing application comprise one or more of a database component, a storage component, a network component, a data processing component, an internet of things component, or a miscellaneous component.

19. The apparatus of claim 11, wherein the one or more monitoring operations are based at least in part on the selection of at least one of the one or more components of the computing application.

20. A non-transitory computer-readable storage medium for generating one or more monitoring operations comprising computer program code for execution by one or more processors of a device, the computer program code configured to, when executed by the one or more processors, cause the device to:

cause a component interface to be displayed on a user interface, wherein the component interface comprises one or more components of a computing application;

cause a modeling interface to be displayed on the user interface;

receive a selection of at least one of the one or more components of the computing application;

in response to the selection of at least one of the one or more components of the computing application, cause an updated modeling interface to be displayed on the user interface, wherein the updated modeling interface comprises a computing application architecture model;

apply an analyzer scanning model to the computing application architecture model:

generate, using the analyzer scanning model, the one or more monitoring operations automatically based on at least in part on the one or more components of the computing application; and display a monitoring interface associated with the one or more monitoring operations, wherein the monitoring interface comprises at least an acceptance component, a denial component, and a reason for the denial component associated with each of the one or more monitoring operations, wherein the one or more monitoring operations comprises at least receiving an input indicating a reason for a denial of one or more monitoring operations via the reason for denial component.

* * * * *